United States Patent [19]
Eskeli

[11] 3,938,336
[45] Feb. 17, 1976

[54] TURBINE WITH HEATING AND COOLING

[76] Inventor: Michael Eskeli, 7994-41 Locke Lee, Houston, Tex. 77042

[22] Filed: Feb. 28, 1974

[21] Appl. No.: 446,692

Related U.S. Application Data

[63] Continuation-in-part of Ser. No. 408,381, Oct. 23, 1973, Pat. No. 3,834,179.

[52] U.S. Cl. ..................... 60/682; 62/401; 62/500; 165/86; 165/88; 415/80; 415/81; 415/178
[51] Int. Cl.²..................... F01K 25/02; F25B 3/00
[58] Field of Search ............ 415/1, 80, 81, 64, 178; 62/401, 499, 500, 501; 60/682; 165/86, 88

[56] References Cited
UNITED STATES PATENTS

| | | | |
|---|---|---|---|
| 1,488,931 | 4/1924 | Marechal | 415/106 |
| 2,393,338 | 1/1946 | Roebuck | 62/401 |
| 2,451,873 | 10/1948 | Roebuck | 62/401 |
| 2,490,064 | 12/1949 | Kollsman | 62/401 |
| 2,490,065 | 12/1949 | Kollsman | 62/402 |
| 2,522,781 | 9/1950 | Exner | 62/499 |
| 2,529,765 | 9/1950 | Exner | 62/499 |
| 3,781,126 | 12/1973 | Benisek | 415/178 X |
| 3,834,179 | 9/1974 | Eskeli | 62/401 |

OTHER PUBLICATIONS

General Information Concerning Patents, a United States Department of Commerce Publication No. 0304-0498.

Primary Examiner—Albert W. Davis, Jr.

[57] ABSTRACT

A method and apparatus for generating power by passing a fluid from a higher energy level to a lower energy level by compressing said fluid first in a continuous flow centrifuge rotor and then reducing the pressure of said fluid in an inward flow reaction turbine section. The fluid enters the first rotor at center and leaves the second rotor at center, and vanes are provided within both rotors to assure that said fluid will rotate with said rotors. Nozzles are provided near the periphery of the first rotor to increase the absolute tangential velocity of the fluid leaving said first rotor; the tangential velocity of second rotor near rotor tip is greater than said first rotor tangential tip velocity. The said fluid is contained within said rotors, and passes from said second rotor to said first rotor near rotor center. Heat is being added to said fluid near the first rotor periphery, and heat is being removed from said fluid near the center of said first rotor; both heat addition and heat removal are mainly conducted during said compression of said fluid. Said fluid is normally a gas, and said heat addition and removal are usually conducted by using a second fluid which may be a gas or a liquid, and a third fluid which may be also a gas or a liquid.

1 Claim, 4 Drawing Figures

U.S. Patent  Feb 17, 1976  3,938,336
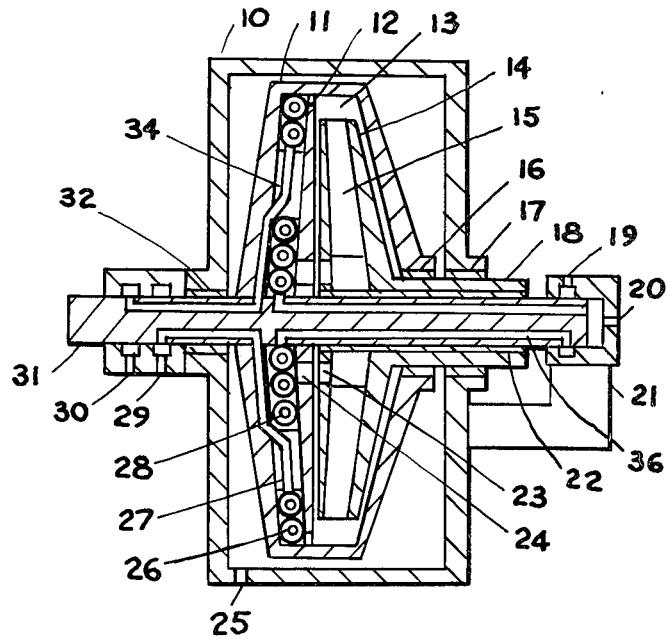
FIG. 1
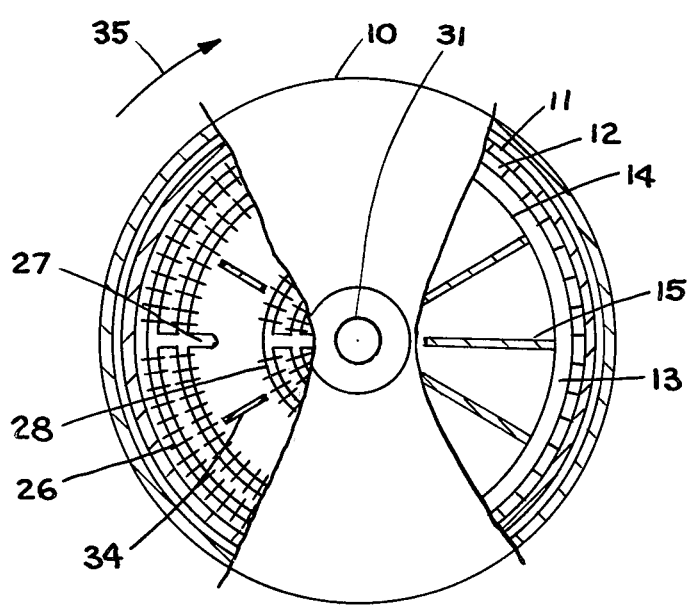
FIG. 2
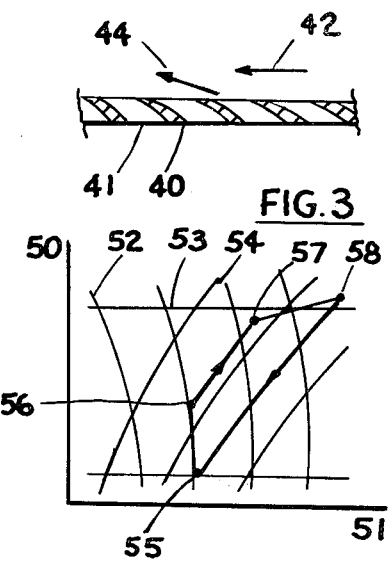
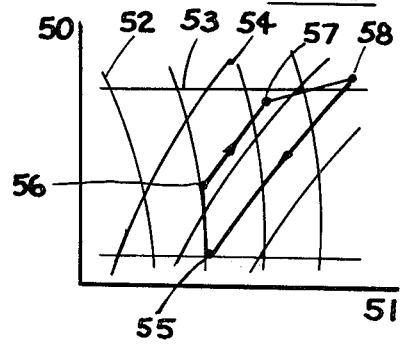
FIG. 3
FIG. 4

TURBINE WITH HEATING AND COOLING

This application is a continuation-in-part application of patent application titled "Turbine with Heating and Cooling," filed Oct. 23, 1973, Ser. No. 408,381. Now U.S. Pat. No. 3,834,179.

The turbine of this application also uses principles previously used in "Heat Exchanger with Three Fluids," Ser. No. 361,281, filed May 17, 1973.

This invention relates generally to devices for generating power in response of a fluid being flowed from a higher energy level to a lower energy level by passing said fluid through a turbine for generating said power.

There have been various types of turbines previously, in some of which a fluid is accelerated in stationary nozzles and then passed to vanes mounted on a rotating rotor wheel, where the kinetic energy contained by said moving fluid is converted to power.

These conventional turbines normally have high energy losses due to fluid friction, especially between rotor vanes and the fluid where the velocity differentials are usually large. Also, these turbines often require complex shaped turbine vanes making the unit costly.

FIG. 1 is a cross section of the turbine, and FIG. 2 is an end view of the turbine with portions removed to show interior details.

FIG. 3 is a detail of first rotor nozzles, and FIG. 4 is a pressure-enthalpy diagram for a typical first fluid, which is the working fluid, of the turbine of this invention.

It is an object of this invention to provide a turbine wherein said first fluid is sealed within said turbine, with first fluid being heated and cooled within the turbine, with said heating of said first fluid being during and after compression, and said cooling of said first fluid being before and during compression.

Referring to FIG. 1, therein is shown a cross section of the turbine, 10 is casing, 11 is first rotor, 12 are first rotor nozzles for said first fluid, 13 is a first fluid space, 14 is second rotor, 15 are second rotor inward passages with vanes, 16 is bearing and seal, 17 is bearing and seal, 18 is second rotor shaft, 19 and 20 are outlet and inlet for third fluid which is a coolant fluid, 21 is holding bracket, 36 is third fluid passage within first rotor shaft 31, 22 is seal and bearing, 23 and 24 are first fluid passages from second rotor to first rotor, 25 is a casing vent into which a vacuum pump may be connected for evacuation of said casing, 26 is a heat exchanger for adding heat to said first fluid from a second fluid being circulated therewithin, 27 is second fluid conduit, 28 is a heat exchanger for removing heat from said first fluid by circulating a third fluid therewithin, 29 and 30 are second fluid exit and entry, 32 is a bearing and seal, 34 is a vane within first fluid outward passage.

In FIG. 2, 10 is casing, 31 is shaft of first rotor 11, 12 are first rotor nozzles, 14 is second rotor, 15 are second rotor vanes, 13 is first fluid space, 34 are first rotor vanes, 26 is heat addition heat exchanger, 33 is heat removal heat exchanger, 27 is second fluid conduit, and 35 indicates direction of rotation for both rotors.

In FIG. 3, a detail of first rotor nozzles is shown. 40 is rotor wall into which said nozzles 41 are mounted, 42 indicates direction of movement and rotation of said nozzles, and 44 indicates first fluid leaving said nozzles 41.

In FIG. 4, a pressure-enthalpy diagram for a typical first fluid is shown. 50 is pressure line and 51 is enthalpy line; 52 is constant temperature line, 53 is constant pressure line, and 54 is constant entropy line. The work cycle is shown with compression starting at point 55 and continuing with heat removal to point 56, after which the compression is approximately isentropic to point 57 and then with heat addition to point 58. Expansion is approximately isentropic, from point 58 to point 55. It should be noted that the diagram is approximate since locations and construction details of the two heat exchangers may change the shape of said diagram; further, since the flow velocity of said first fluid relative to said rotor is low, the work of compression and the work of expansion may be functions of internal energy changes more than functions of enthalpy changes.

In operation, the cavity within the two rotors is filled with a suitable first fluid, and the first rotor is caused to rotate by using an external starter. Said first fluid is accelerated by said rotating rotor with accompanying compression within said first rotor with vanes and heat exchanger fins assuring that said first fluid will rotate with said first rotor. Heat is added to said first fluid during and after compression from a second fluid being circulated in heat exchange relationship within a heat exchanger with said first fluid; after said heat addition, said first fluid is passed through a set of nozzles mounted near the periphery of said first rotor, with said nozzles being oriented to pass said first fluid in forward direction thus increasing the absolute tangential velocity of said first fluid. After leaving said nozzles, said first fluid enters said second rotor first fluid passages, said passages are inward toward the center of said second rotor where said first fluid is decelerated with work associated with such deceleration being passed to said second rotor with vanes 24 assuring that said first fluid will rotate with said second rotor. After such deceleration and expansion of said first fluid, said first fluid is passed to said first rotor via passges near rotor center, and then heat is removed from said first fluid before and during compression, with a third fluid being circulated in heat exchange relationship with said first fluid in a heat exchanger.

In the process hereinbefore described, said first fluid is accelerated and compressed within said first rotor with first removing heat, after that compressing the first fluid adiabatically in most instances, and then adding heat, with said heat removal and addition increasing the density of the first fluid during said compression to a value that is greater than the density of said first fluid during said expansion. Thus a greater second rotor tip speed can be maintained while still also maintaining first fluid circulation within said rotors, and thus the work output from said second rotor will be greater than the work input to said first rotor; the difference in these work quantities being the useful work output of the turbine. Also, by providing heat removal during said compression, a greater amount of work can be obtained from a low temperature heat source.

The turbine described herein is suitable for high speed operation. The rotors may be encased in a vacuum chamber to eliminate friction on rotor external surfaces. The rotors are normally made of high strength materials, and the heat exchangers may be made of finned tubing as shown. The rotor vanes are shown to be radial; they may be also curved in conventional manner, if desired.

The fluids used with the turbine of this invention, are commonly available. For said first fluid, various gases may be used. Said second fluid may be either a gas or a liquid. Said third fluid also may be either a gas or a liquid.

In situations where said second fluid is a gas, there will be a temperature increase of said second fluid due to centrifugal compression within the first rotor passages and said heat addition heat exchanger. By selecting said second fluid such that said temperature increase for said second fluid is greater than for said first fluid, heat can be added to said first fluid even when the entry temperature of said second fluid is the same or even lower than the temperature of said first fluid at rotor center. Also, this means can be used to obtain additional heat transfer when said second fluid is a gas, at a higher entry temperature than said first fluid is at rotor center. Further, it is also possible to employ said second fluid, when said second fluid is a gas, after heat removal within said heat exchanger 26, and subsequent expansion and temperature decrease, as said third fluid within heat exchanger 28. In these arrangements, the flow of said second fluid is arranged to be usually in what is known as "counterflow" within heat exchanger 26, and also in "counterflow" in heat exchanger 28, for best efficiency.

Various governors, gauges and the like are employed with the turbine of this invention. They do not form a part of this invention and are not further described herein.

I claim:

1. An improvement in a turbine for generating power, said turbine comprising:
   a. a casing for supporting rotor shafts;
   b. shafts journalled in bearings in said casing for rotation;
   c. a rotating first rotor mounted on a shaft so as to rotate therewith, said first rotor being of circular configuration, and having an entry port for a first fluid near the center of said first rotor and having a radially outwardly extending passageway for said first fluid for effecting acceleration and centrifugal compression of said first fluid; said radially extending passageway being provided with a heat exchanger for adding heat to said first fluid during and after compression; said radially extending passageway being provided with a set of nozzles at its downstream end for passing said first fluid with said nozzles oriented to discharge said first fluid in forwardly tangential direction;
   d. a rotating second rotor mounted on a shaft so as to rotate therewith; said second rotor having an entry for said first fluid adjacent to said first rotor nozzles for receiving said first fluid, with inward extending first fluid passageway for expansion of said first fluid and for receiving by said rotor the work associated with deceleration of said first fluid; said second rotor having an exit port for said first fluid near the center of said rotor for passing said first fluid into said first rotor;
   e. a heat removal heat exchanger being provided to cool said first fluid before and during early part of compression, said heat removal heat exchanger being within said first rotor and being in heat exchange relationship with said first fluid.

* * * * *